March 15, 1932. H. MAGNUS 1,849,496
APPARATUS FOR VACUUM DEHYDRATION OF HYDROCARBONS
Filed Sept. 29, 1927
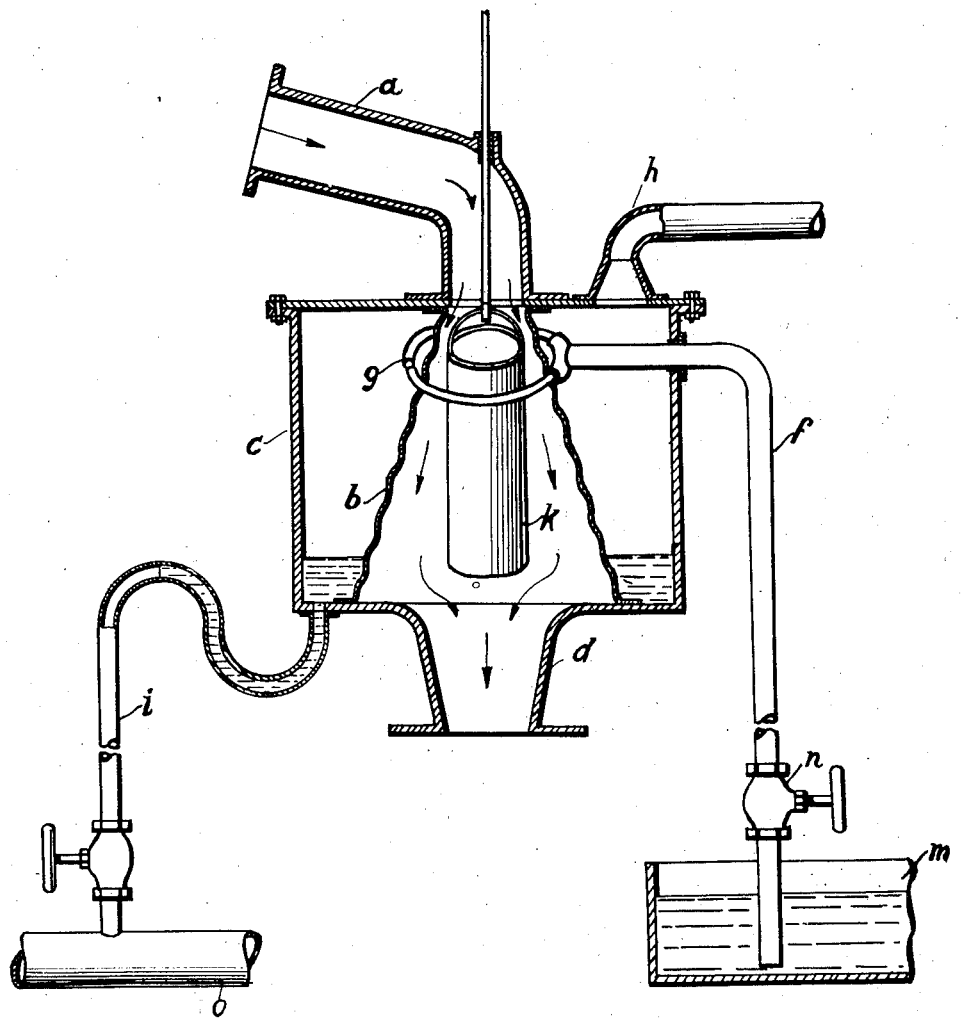

Patented Mar. 15, 1932

1,849,496

UNITED STATES PATENT OFFICE

HANS MAGNUS, OF MERZHAUSEN, BREISGAU, GERMANY

APPARATUS FOR VACUUM DEHYDRATION OF HYDROCARBONS

Application filed September 29, 1927, Serial No. 222,886, and in Germany October 7, 1926.

This invention relates to an apparatus for dehydrating and distilling aqueous crude oil and tars. It has become known to carry out the dehydrating and distilling operation under vacuum by means of waste heat, with the attendant difficulty however that at the beginning of the water and oil evaporation the crude liquids become turbulent, steam-filled bubbles or bubbles filled with light oil-vapors arising at a low temperature being produced. This difficulty is avoided by continuous treatment of raw material in a column-apparatus, wherewith however the difficulty is connected that the raw material heated in the evaporator cannot be distilled to form hard pitch but is obtained as tar, i. e. as a product still containing constituents (lubricating oil) which can be vaporized.

According to the present invention, a corrugated conical body is provided over the outer surface of which the raw material is sprinkled. This conical body is open at the top and bottom and the heating medium passes right through, whereby the waste gases or vapours from any source of heat may be utilized advantageously when passing off to the flue. For regulating the heat applied to the surface of the conical body, for which purpose waste heat is preferably used, a register is provided, the free cross section of which is always such as to allow of the passage of the heating gases, which are deflected more or less towards the surface of the body. In this manner the flow is not impeded even when the heating is reduced, so that the generation of heat at the source of waste heat is not unfavorably influenced.

An embodiment of the invention is illustrated, by way of example, in the only figure of the accompanying drawing which shows an apparatus in front elevation and partly in vertical section.

The apparatus consists of a partly evacuated vessel $c$, in the top plate of which a pipe $a$ is mounted through which the heat carrier, for instance the hot vapors from a distillation or dry distillation plant in the same factory, flows into a conical body $b$ to flow out through a discharge pipe $d$, for instance to a condenser plant. A pipe $f$ ending at the lower end in a reservoir $m$ for the raw-material projects at the upper end into the said vessel $c$ and terminates in a distributing ring $g$ which has sprinkling nozzles and encircles the upper end of the conical body $b$ so that the raw material, forced by direct suction or by means of a pump $p$ from the reservoir through pipe $f$, is distributed over the outer surface of the conical body $b$. The vapors which are produced in the vessel $c$ are sucked off through a pipe $h$ which leads to the condenser or to a vacuum pump.

The dehydrated and fractionized raw material is siphoned off through a pipe $i$ communicating with the bottom plate of vessel $c$, through a curved portion of this pipe into a vessel $o$ for further use. The curved portion or goose neck of the pipe $i$ acts as a siphon when the vessel $c$ is charged with raw material to a predetermined height and the raw material is drawn from the vessel through pipe $i$ by a suction action.

The pipe $i$, descends either so far down that it acts as a barometric suction pipe, or it is fitted with a device for creating suction therein. An axially adjustable register $k$, projects into the conical body $b$. When this register $k$ is raised, it forms as it were an extension of the pipe $a$ and the vapors or gases are conducted directly from pipe $a$ to the discharge pipe $d$. When the register $k$ is lowered, the same is spaced from the inlet pipe $a$ so that hot vapors flowing through the pipe $a$ expand in the conical body $b$ to effect a more thorough and intense heating of the wall of the conical body.

As an alternative the heating gases may be conducted in a reverse direction so that they enter through pipe $d$ and flow out through pipe $a$, this arrangement being preferable when the apparatus is designed to serve simultaneously as a dephlegmator or condensor.

I claim:—

1. An apparatus for dehydrating and distilling aqueous crude oils and tars, comprising in combination a vessel with a partial vacuum chamber, an internally heated conical body in said vessel and having a corrugated wall opening at its ends at the top and bottom of the casing and closing the casing to atmosphere, a reservoir for the raw material underneath said vessel, a supply pipe upwardly extending from said reservoir and projecting into said vessel to feed raw material into the vessel by suction, a spray ring at the inner end of said supply pipe encircling the upper end of said conical heating body, a supply pipe for conducting hot gases into said conical body, a discharge pipe for the oil vapors in the top plate of said vessel, and a discharge pipe for the residues downwardly directed from the bottom plate of the vessel.

2. In an apparatus as specified in claim 1, in combination with the internally heated conical body, a register in said heating body adjustable in vertical direction for guiding according to requirement the heating gases more or less along the heating surface or directly to the outflow pipe without reducing the area of the passage for the heating gases.

3. An apparatus as specified in claim 1, in which an extension of the supply pipe for the hot oil vapors in the conical body a cylindrical register is arranged so that it can be adjusted in vertical direction to regulate within predetermined limits the transmission of the heat from the hot oil vapours to the wall of said cylindrical body.

4. An apparatus for dehydrating by means of waste heat oils and tars containing easily volatile parts, comprising in combination, an internally heated conical body located within a vacuum vessel containing the material to be treated, open at the top and bottom with the heating medium flowing therethrough from the smaller end to the larger end, a register in said heating body adapted to be shifted into the smaller end of the conical body to regulate the flow of the heating medium according to requirement, more or less close to the heating surface or directly to the overflow opening without reducing the passage for the heating gases and vapors, said register being cylindrical and arranged as extension of the supply pipe for the heating medium in the conical body so that it can be adjusted in vertical direction to regulate within predetermined limits the transmission of the heat from the heating medium to the wall of said cylindrical body.

5. An apparatus as specified in claim 4, in which the vacuum chamber comprising a vessel, the conical body in said vessel having a corrugated wall through which the heating elements flow, a reservoir for the raw material underneath said vessel, a supply pipe upwardly extending from said reservoir and projecting into said vessel, a spring ring at the inner end of said supply pipe encircling the upper end of said conical heating body, a supply pipe for conducting hot gases into said conical body, a discharge pipe for the oil vapors in the top plate of said vessel, and a discharge pipe for the residues downwardly directed from the bottom plate to the vessel, said discharge pipe terminating, according to the vacuum in said vessel, at such a distance underneath said vessel that it acts as a barometric suction pipe, said reservoir for the raw material being situated higher than the end of said discharge pipe in order to make the raw material flow through the reaction vessel without the assistance of a conveying device and in maintaining the vacuum.

In testimony whereof I affix my signature.
DR. HANS MAGNUS.